US012662259B1

(12) United States Patent
Bauman et al.

(10) Patent No.: US 12,662,259 B1
(45) Date of Patent: Jun. 23, 2026

(54) SPACE DOMAIN AWARENESS SENSOR AND RELATED METHODS AND SYSTEMS

(71) Applicant: Launchspace Technologies Corporation, Boca Raton, FL (US)

(72) Inventors: John H. Bauman, Boca Raton, FL (US); Chris Rollins, Upper Marlboro, MD (US)

(73) Assignee: Launchspace Technologies Corporation, Boca Raton, FL (US)

( * ) Notice: Subject to any disclaimer, the term of this patent is extended or adjusted under 35 U.S.C. 154(b) by 42 days.

(21) Appl. No.: 18/518,111

(22) Filed: Nov. 22, 2023

Related U.S. Application Data

(60) Provisional application No. 63/513,609, filed on Jul. 14, 2023, provisional application No. 63/492,091, filed on Mar. 24, 2023.

(51) Int. Cl.
| | |
|---|---|
| *B64G 1/68* | (2006.01) |
| *B64G 1/10* | (2006.01) |
| *B64G 1/56* | (2006.01) |
| *G01S 17/86* | (2020.01) |
| *G01S 17/933* | (2020.01) |

(52) U.S. Cl.
CPC .............. *B64G 1/68* (2013.01); *B64G 1/1081* (2023.08); *B64G 1/56* (2013.01); *G01S 17/86* (2020.01); *G01S 17/933* (2013.01)

(58) Field of Classification Search
CPC ......... B64G 1/68; B64G 1/1081; G01S 17/86; G01S 17/933; G60T 5/92; G60T 7/80
See application file for complete search history.

(56) References Cited

U.S. PATENT DOCUMENTS

| | | | |
|---|---|---|---|
| 3,004,735 | A | 10/1961 | Kinard |
| 3,277,724 | A | 10/1966 | Lundeberg |
| 3,381,420 | A | 5/1968 | Norman |
| 4,306,692 | A | 12/1981 | Kaplan |
| 4,381,092 | A | 4/1983 | Barker |
| 4,991,799 | A | 2/1991 | Petro |
| 5,257,034 | A | 10/1993 | Turner |
| 5,259,577 | A | 11/1993 | Achkar |
| 5,277,385 | A | 1/1994 | Flament |

(Continued)

OTHER PUBLICATIONS

Woignier et al., Aerogels Materials as Space Debris Collectors, Hindawi Publishing Corp. 2013.

*Primary Examiner* — Tan Q Nguyen
(74) *Attorney, Agent, or Firm* — Wiley Rein LLP

(57) ABSTRACT

A space domain awareness (SDA) system includes several sensor spacecraft, some in Earth orbit and others in cislunar space. Each sensor spacecraft can include a sensor payload of an active optical sensor (e.g., a laser emitter and laser detector) and an SDA processor. The processor detects, tracks, and characterizes resident space objects (RSOs) using the output from the active optical sensor. In some embodiments, the sensor payload also includes a passive optical sensor, an electromagnetic sensor, and/or a plasma sensor; the SDA processor can use the outputs of these optional additional sensors to detect, track, and characterize RSOs as well. It is also contemplated that the SDA system can include a plurality of debris capture spacecraft, each of which includes a debris impact pad that includes a series of shield and stuffing layers that respectively increase in density along an intercept direction.

20 Claims, 6 Drawing Sheets

(56)                    References Cited

U.S. PATENT DOCUMENTS

| | | | |
|---|---|---|---|
| 5,299,764 A | 4/1994 | Scott | |
| 5,372,340 A | 12/1994 | Ihara | |
| 5,485,485 A | 1/1996 | Briskman | |
| 5,511,748 A | 4/1996 | Scott | |
| 5,813,632 A | 9/1998 | Taylor | |
| 6,085,128 A | 7/2000 | Middour | |
| 6,116,544 A | 9/2000 | Forward | |
| 6,419,191 B1 | 7/2002 | Hoyt | |
| 6,439,508 B1 | 8/2002 | Taylor | |
| 6,484,973 B1 | 11/2002 | Scott | |
| 6,655,637 B1 | 12/2003 | Robinson | |
| 6,845,303 B1 | 1/2005 | Byler | |
| 6,945,500 B2 | 9/2005 | Wingo | |
| 6,962,310 B1 | 11/2005 | Bigelow | |
| 7,575,200 B2 | 8/2009 | Behrens | |
| 7,905,453 B2 | 3/2011 | Benedict | |
| 8,322,648 B2 | 12/2012 | Kroetsch | |
| 9,296,477 B1 | 3/2016 | Coburn | |
| 9,434,485 B1 | 9/2016 | Lehocki | |
| 9,555,905 B2 | 1/2017 | Griffith, Sr. | |
| 9,617,017 B1 | 4/2017 | Kaplan | |
| 9,714,101 B1 | 7/2017 | Kaplan | |
| 2003/0025037 A1 | 2/2003 | Mazanek | |
| 2004/0026571 A1 | 2/2004 | Scott | |
| 2004/0245407 A1 | 12/2004 | D'Ausilio | |
| 2005/0060092 A1 | 3/2005 | Hablani | |
| 2005/0067534 A1 | 3/2005 | Anderman | |
| 2005/0151022 A1 | 7/2005 | D'Ausilio | |
| 2005/0258311 A1 | 11/2005 | Scott | |
| 2006/0038085 A1 | 2/2006 | Duden | |
| 2006/0090636 A1 | 5/2006 | Yang | |
| 2006/0145024 A1 | 7/2006 | Kosmas | |
| 2007/0040067 A1 | 2/2007 | D'Asuilio | |
| 2008/0149776 A1 | 6/2008 | Benedict | |
| 2008/0296436 A1 | 12/2008 | D'Ausilio | |
| 2009/0164055 A1 | 6/2009 | Kosmas | |
| 2011/0121139 A1 | 5/2011 | Poulos | |
| 2011/0198446 A1 | 8/2011 | Knirsch | |
| 2011/0245997 A1 | 10/2011 | Marty | |
| 2011/0297794 A1 | 12/2011 | Johnson | |
| 2012/0068018 A1 | 3/2012 | Wright | |
| 2012/0175467 A1* | 7/2012 | Dye | B64G 1/50 |
| | | | 244/171.7 |
| 2012/0286097 A1 | 11/2012 | Hanada | |
| 2013/0062472 A1 | 3/2013 | Stokes | |
| 2013/0175401 A1 | 7/2013 | Starke | |
| 2014/0341586 A1 | 11/2014 | Wyler | |
| 2014/0367523 A1 | 12/2014 | Kitazawa | |
| 2015/0102174 A1 | 4/2015 | Chu | |
| 2015/0115107 A1* | 4/2015 | Andoh | B64G 1/242 |
| | | | 244/171.1 |
| 2015/0259081 A1 | 9/2015 | Albert | |
| 2016/0023783 A1 | 1/2016 | Griffith | |
| 2016/0094288 A1 | 3/2016 | Krebs | |
| 2016/0130020 A1 | 5/2016 | Chambert | |
| 2016/0149599 A1 | 5/2016 | Lindsay | |
| 2016/0244190 A1 | 8/2016 | Okada | |
| 2017/0015444 A1 | 1/2017 | Okada | |
| 2017/0029138 A1 | 2/2017 | Bultel | |
| 2017/0096242 A1 | 4/2017 | Alfano | |
| 2017/0373754 A1* | 12/2017 | Davis | H04B 10/1123 |
| 2018/0111702 A1 | 4/2018 | Kaplan | |
| 2018/0127115 A1* | 5/2018 | Choi | B64G 1/2222 |
| 2018/0346153 A1* | 12/2018 | Kaplan | B64G 1/244 |
| 2021/0011148 A1* | 1/2021 | Blondel | B64G 1/105 |
| 2023/0211896 A1* | 7/2023 | Gegout | B64G 1/56 |
| | | | 701/301 |

* cited by examiner

SPACE DOMAIN AWARENESS SENSOR AND RELATED METHODS AND SYSTEMS

CROSS-REFERENCE TO RELATED APPLICATIONS

This application claims the benefit of U.S. provisional application No. 63/384,622, filed 22 Nov. 2022 ("the '622 provisional"), U.S. provisional application No. 63/492,091, filed 23 Mar. 2023 ("the '091 provisional"), and U.S. provisional application No. 63/513,609, filed 14 Jul. 2023 ("the '609 provisional"). The '622, '091, and '609 provisionals are hereby incorporated by reference as though fully set forth herein.

BACKGROUND

The present disclosure relates generally to space domain awareness (SDA) and active debris removal (ADR). In particular, the present disclosure relates to sensors for space domain awareness and methods and systems incorporating the same.

Orbital debris (also referred to herein as "debris") has become a significant hazard for space missions. Larger pieces of debris have been tracked from the ground using radar and other methods, but these methods are limited in terms of the size of debris they can detect and track, often without constant custody, to objects typically on the order of about 2 cm and larger. They are also limited in their ability to maintain constant custody of debris and other resident space objects (RSOs) to objects on the order of about 10 cm and larger. Of course, it may be possible to project the orbital trajectories of these larger RSOs with relatively high accuracy.

Moreover, as the debris population grows, smaller debris (less than about 10 cm) is expected to pose an increasing challenge to space operations. For instance, there are substantially more smaller debris objects between about 1 mm and about 10 cm (likely well over 100 million) than there are debris objects larger than about 10 cm (only about 30,000). Further, debris objects that are smaller than about 1 mm, which potentially number in the trillions, have the potential to block access to entire regions of low Earth orbit (LEO) and beyond, including through a cascading chain reaction phenomenon known as the Kessler Syndrome.

Yet, due to their size and the inherent limitations of extant detection techniques, these smaller RSOs, sometimes also referred to as lethal non-trackable (LNT) debris, are challenging to detect. They are likewise challenging to track and characterize, in part because of their susceptibility to influence by various perturbing forces (e.g., electrostatic forces, solar wind, solar pressure, inhomogeneity in Earth's magnetic field, and the like) that render their orbital trajectories difficult to model predictively. This also makes it more challenging to project future conjunctions between these smaller RSOs and active spacecraft.

BRIEF SUMMARY

The instant disclosure provides a space domain awareness (SDA) system. The SDA system includes a plurality of sensor spacecraft, each of which in turn includes: an active optical sensor; and an SDA processor. The SDA processor is configured to: receive an output from the active optical sensor; detect a resident space object (RSO) using the output from the active optical sensor; compute a projected orbital trajectory of the RSO using the output from the active optical sensor; and characterize the RSO using the output from the active optical sensor.

According to aspects of the disclosure, the plurality of sensor spacecraft includes a plurality of sensor spacecraft in equatorial low Earth orbit. For example, the SDA system can include three sensor spacecraft in equatorial low Earth orbit, wherein the three sensor spacecraft are spaced apart from each other by 120 degrees.

According to additional aspects of the disclosure, the plurality of sensor spacecraft can include a plurality of sensor spacecraft in cislunar space. For example, the SDA system can include a first sensor spacecraft positioned at Lagrange point L4 and a second sensor spacecraft positioned at Lagrange point L5.

It is contemplated that the SDA processor can also be configured to compute a conjunction between the RSO and a spacecraft of interest using the projected orbital trajectory of the RSO.

The SDA processor can also be configured to characterize the RSO as an active spacecraft when an actual orbital trajectory of the RSO deviates from the projected orbital trajectory of the RSO by more than a preset threshold amount.

In certain embodiments of the disclosure, the SDA system further includes a passive optical sensor. The SDA processor can, in turn, be further configured to: receive an output from the passive optical sensor; detect the RSO using the output from the active optical sensor and the output from the passive optical sensor; compute the projected orbital trajectory of the RSO using the output from the active optical sensor and the output from the passive optical sensor; and characterize the RSO using the output from the active optical sensor and the output from the passive optical sensor.

In other embodiments of the disclosure, the SDA system further includes an electromagnetic sensor. The SDA processor can, in turn, be further configured to: receive an output from the electromagnetic sensor; detect the RSO using the output from the active optical sensor and the output from the electromagnetic sensor; compute the projected orbital trajectory of the RSO using the output from the active optical sensor and the output from the electromagnetic sensor; and characterize the RSO using the output from the active optical sensor and the output from the electromagnetic sensor.

In still other embodiments of the disclosure, the SDA system further includes a plasma sensor. The SDA processor can, in turn, be further configured to: receive an output from the plasma sensor; detect the RSO using the output from the active optical sensor and the output from the plasma sensor; compute the projected orbital trajectory of the RSO using the output from the active optical sensor and the output from the plasma sensor; and characterize the RSO using the output from the active optical sensor and the output from the plasma sensor.

The active optical sensor can include: a laser emitter configured to emit a non-collimated laser beam to illuminate a volume of space containing the RSO; and a laser detector configured to detect a reflection of the non-collimated laser beam from the RSO.

It is also contemplated that the SDA system can include a plurality of debris capture spacecraft. Each debris capture spacecraft can include at least one debris impact pad, which in turn includes: a plurality of shield layers arranged in a series of planes, wherein the series of planes is non-parallel to an intercept direction, wherein each shield layer of the plurality of shield layers has a respective density, and wherein the respective densities of the plurality of shield layers increase along the intercept direction. The at least one debris impact pad can also include a plurality of stuffing layers interposed between the plurality of shield layers, wherein each stuffing layer of the plurality of stuffing layers has a respective density, and wherein the respective densities of the plurality of stuffing layers increase along the intercept direction.

The stuffing layers can include one or more aerogel layers, at least one of which has a gradient density that increases in the intercept direction.

Also disclosed herein is a space domain awareness (SDA) sensor, including: a laser emitter configured to emit a non-collimated laser beam to illuminate a volume of space containing a resident space object (RSO); a laser detector configured to detect a reflection of the non-collimated laser beam from the RSO; and an SDA processor in operable communication with the laser emitter and the laser detector and configured to compute a distance from the SDA sensor to the RSO.

The laser emitter has a pulse frequency and is configured to emit a series of non-collimated laser beam pulses at the pulse frequency. The non-collimated laser beam has a cone angle. In embodiments of the disclosure, the pulse frequency and the cone angle are selected such that the RSO will be within the volume of space for at least two successive beam pulses of the series of non-collimated laser beam pulses.

The SDA processor can be configured to compute a velocity of the RSO.

The SDA sensor optionally includes an optical detector configured to capture an optical image of the RSO when the volume of space is illuminated by the non-collimated laser beam.

The instant disclosure also provides an apparatus for capturing a resident space object (RSO). The apparatus includes: a plurality of shield layers arranged in a series of planes, wherein the series of planes is non-parallel to an intercept direction, wherein each shield layer of the plurality of shield layers has a respective density, and wherein the respective densities of the plurality of shield layers increase along the intercept direction.

Each shield layer of the plurality of shield layers has a respective thickness, and the respective thicknesses of the plurality of shield layers can increase along the intercept direction.

The apparatus can further include a plurality of stuffing layers interposed between the plurality of shield layers. Each stuffing layer of the plurality of stuffing layers has a respective density, and the respective densities of the plurality of stuffing layers can increase along the intercept direction.

In embodiments of the disclosure, at least one stuffing layer of the plurality of stuffing layers has a gradient density that increases along the intercept direction.

The plurality of stuffing layers can include at least one aerogel layer. According to certain aspects of the disclosure, the aerogel layer can include a gradient density aerogel layer, wherein the gradient density aerogel layer is oriented such that a density of the gradient density aerogel layer increases along the intercept direction.

The plurality of shield layers are spaced apart from each other along the intercept direction, and the spacing between successive shield layers of the plurality of shield layers can be configured to minimize spall ejecta (larger than about 1 mm) from the apparatus when the RSO, traveling along the intercept direction, impacts the plurality of shield layers.

At least one shield layer of the plurality of shield layers can include a non-metallic shield layer, such as an aerogel layer.

In a further aspect, the instant disclosure relates to an apparatus for capturing a resident space object (RSO). The apparatus includes a first shield layer; a second shield layer spaced apart from the first shield layer along an intercept direction; a first stuffing layer between the first shield layer and the second shield layer; a third shield layer spaced apart from the second shield layer along the intercept direction; and a second stuffing layer between the second shield layer and the third shield layer; wherein at least one of the first stuffing layer and the second stuffing layer comprises a gradient density aerogel oriented to have a density that increases along the intercept direction. The apparatus can also include an aerogel layer on an outside surface of the first shield layer.

The foregoing and other aspects, features, details, utilities, and advantages of the present invention will be apparent from reading the following description and claims, and from reviewing the accompanying drawings.

While multiple embodiments are disclosed, still other embodiments of the present disclosure will become apparent to those skilled in the art from the following detailed description, which shows and describes illustrative embodiments. Accordingly, the drawings and detailed description are to be regarded as illustrative in nature and not restrictive.

DETAILED DESCRIPTION

The instant disclosure relates to a space domain awareness (SDA) system, which can include both sensor spacecraft and debris remediation (e.g., debris capture) spacecraft, as well as related apparatus (e.g., sensors, debris impact pads, and enhanced debris shielding) and methods (e.g., to detect, track, and/or characterize resident space objects (RSOs)). The teachings herein offer various advantages over extant techniques, including, without limitation:

Enhanced detection and tracking of small RSOs, on the order of about 1 mm and smaller in diameter, including high area-to-mass ratio (HAMR) debris;

Improved characterization of RSOs, including the recognition of active spacecraft masquerading as passive debris;

Mitigation of blind spots caused, for example, by solar glare (e.g., when the sun approaches the field of view of a sensor), eclipses, and shadowing (e.g., when only a small portion of an RSO is illuminated);

Minimization of the creation of additional debris from spall ejecta (e.g., backward splatter) during debris capture operations; and Ensuring that RSOs of particular sizes are reliably captured, and that larger RSOs are avoided through orbital maneuvering.

Figure 1:
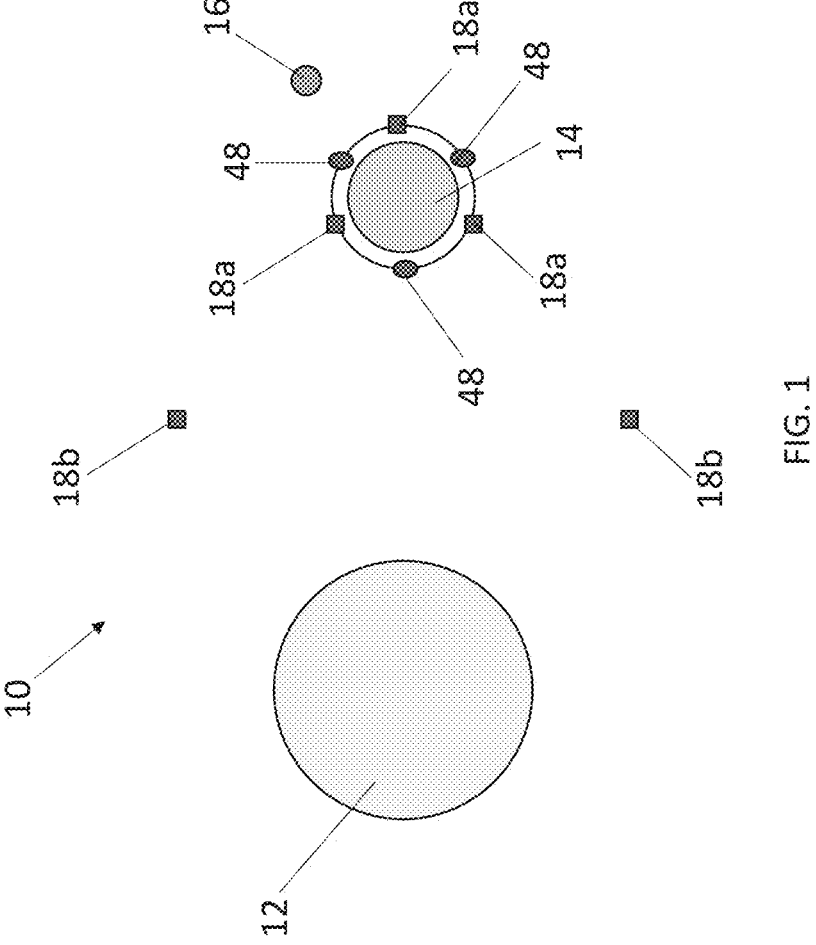
FIG. 1 is a schematic depiction of a space domain awareness (SDA) system according to aspects of the instant disclosure.

FIG. 1 schematically depicts an SDA system 10. For reference, FIG. 1 includes the sun 12, Earth 14, and the Moon 16, though they are not drawn to scale.

FIG. 1 also depicts a plurality of sensor spacecraft (generally denoted by reference numeral 18). More particularly, FIG. 1 depicts a first plurality of sensor spacecraft 18a in Earth orbit and a second plurality of sensor spacecraft 18b in cislunar space.

FIG. 1 depicts an embodiment of disclosure in which first plurality of sensor spacecraft 18a includes three sensor spacecraft 18a in equatorial low Earth orbit at an interval of about 120°. Those of ordinary skill in the art will appreciate, however, that this configuration of sensor spacecraft 18a is merely exemplary, and other configurations of sensor spacecraft 18a are contemplated. For instance, first plurality of sensor spacecraft 18a can be in inclined orbits, outside of low Earth orbit (e.g., in geosynchronous Earth orbit (GEO)), or in combinations thereof. First plurality of sensor spacecraft 18a may also be capable of maneuvering in their current orbits and/or between different orbits using methods that will be familiar to those of ordinary skill in the art.

Likewise, first plurality of sensor spacecraft 18a can include more (or fewer) sensor spacecraft 18a. Indeed, in some embodiments of the disclosure, first plurality of sensor spacecraft 18a can include up to twenty-four sensor spacecraft 18a, though this additional exemplary embodiment should also not be regarded as imposing an upper limit on the number of sensor spacecraft 18a.

Figure 2:
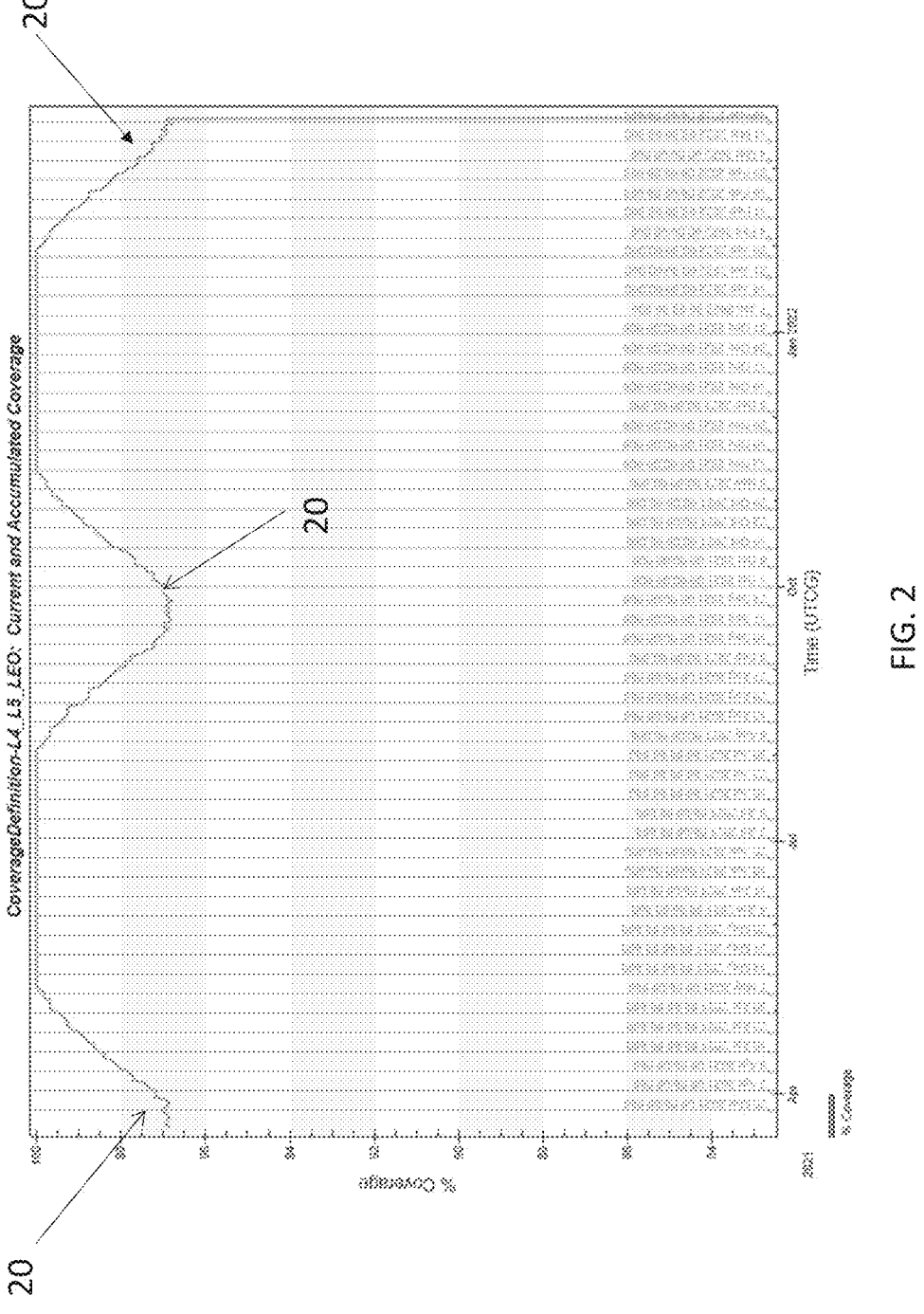
FIG. 2 represents sensor coverage of the SDA solution of FIG. 1.

Second plurality of sensor spacecraft 18b in cislunar space includes sensor spacecraft 18b at the L4 and L5 Lagrange points. This configuration of sensor spacecraft 18b, when coupled with sensor spacecraft 18a in Earth orbit, is particularly advantageous to mitigate blind spots and other exclusions. Indeed, as shown in FIG. 2, the only blind spots 20 for the configuration of sensor spacecraft 18a, 18b depicted in FIG. 1 are eclipse-related; all other exclusions (e.g., solar blindness, shadowing, and other exclusions that those of ordinary skill in the art will appreciate) are mitigated by combining sensor spacecraft 18a in Earth orbit (e.g., equatorial low Earth orbit) with sensor spacecraft 18b in cislunar space. Stated another way, the configuration shown in FIG. 1 offers full 4π steradian coverage from low Earth orbit to cislunar space, except during portions of eclipses.

Of course, it should be understood that additional sensor spacecraft 18b could be deployed in cislunar space, such as at other Lagrange points, depending upon the sensor coverage required by or desirable in connection with a particular mission or application of SDA system 10, without departing from the scope of the instant disclosure.

The ordinarily-skilled artisan will be familiar with the general construction of a sensor spacecraft, such as sensor spacecraft 18a, 18b. Thus, a detailed description of sensor spacecraft 18 is not necessary for the understanding of the instant disclosure. Instead, sensor spacecraft 18 will be further described herein only to the extent necessary to understand the instant disclosure.

Figure 3:
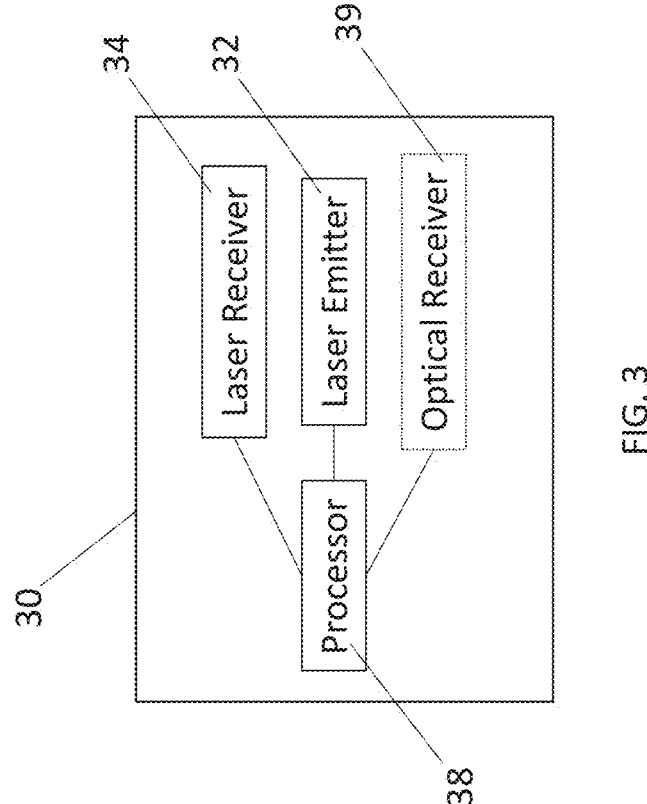
FIG. 3 is a block diagram of a sensor payload that may be utilized to good advantage in the SDA system of FIG. 1.

In this regard, FIG. 3 is a block diagram of the sensor payload 30 of sensor spacecraft 18. As shown in FIG. 3, sensor payload 30 includes a laser emitter 32, a laser receiver 34, and an SDA processor 38. Sensor payload 30 can also optionally include an optical receiver 39.

Laser emitter 32 and laser receiver 34 are collectively referred to herein as an "active optical sensor," with the term "active" referring to the fact that laser emitter 32, when activated as described in further detail below, will actively illuminate a volume of space ahead of sensor payload 30, and laser receiver 34 will receive return signals (e.g., reflections) of this active illumination.

Optical receiver 39 (e.g., a standard imaging telescope, two-dimensional camera, or the like), on the other hand, is referred to herein as a "passive optical sensor," in that it does not include its own source of illumination. Rather, it captures light from an outside illumination source, such as reflected sunlight or laser illumination from laser emitter 32.

Figure 4:
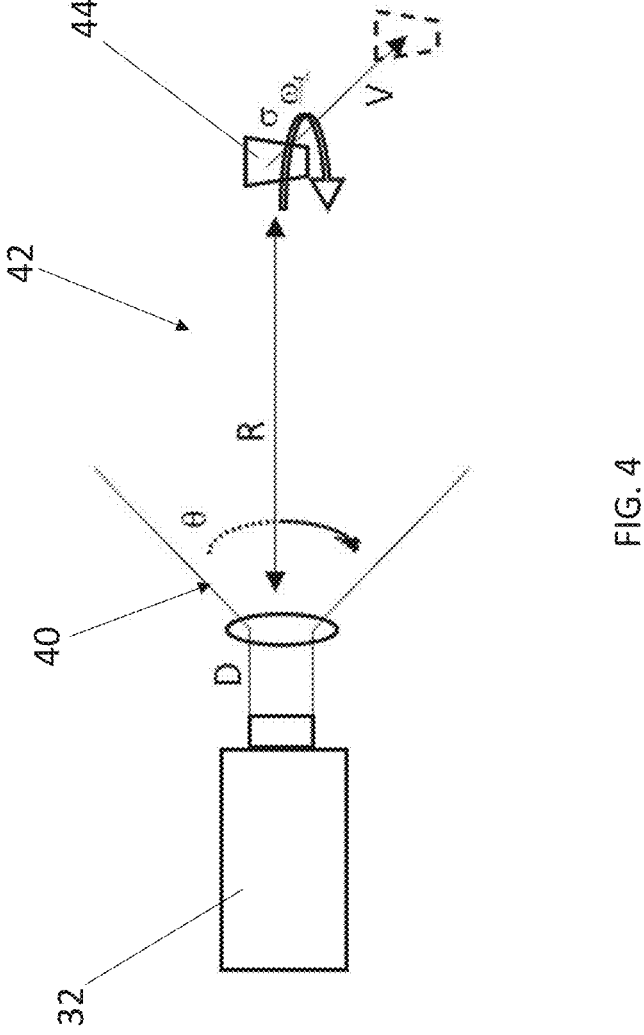
FIG. 4 schematically depicts use of the laser emitter in the sensor payload of FIG. 3.

As shown in FIG. 4, laser emitter 32 has an aperture diameter D (e.g., about 10 cm) and is configured to emit a non-collimated (that is, spreading) laser beam 40, having a cone angle $\Theta$ (e.g., about 0.70), to illuminate a volume of space (or "field of view") 42 that contains an RSO 44 at a range R from laser emitter 32. RSO 44 has an average laser cross-section $\sigma$, a rotational velocity $\omega_r$, and is moving through space 42 with a velocity v.

Figure 5:
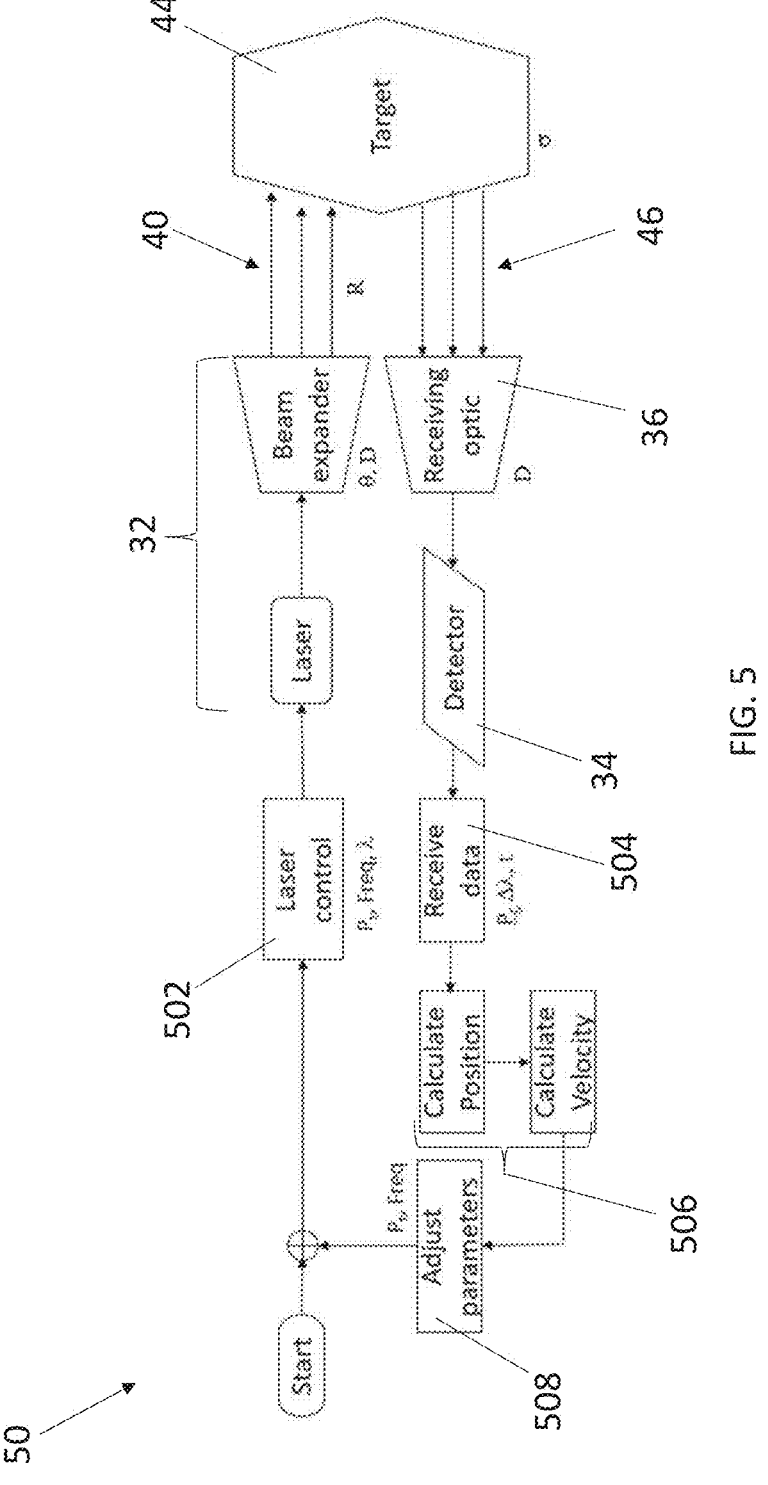
FIG. 5 is a functional block diagram of the sensor payload of FIG. 3.

FIG. 5 is a flow diagram 50 of the operation of sensor payload 30. In block 502, SDA processor 38 defines initial operating parameters for laser beam 40, including transmit power $P_t$, pulse rate (or frequency) f, and wavelength $\lambda$. In some embodiments of the disclosure, the transmit power $P_t$ is between about 0.8 mJ and about 1.6 mJ and the pulse rate f is about 16 kHz.

Based on these initial operating parameters, laser emitter 32 emits laser beam 40 towards RSO 44.

Laser receiver 34 and optical receiver 39 (if present) receive reflections 46 from RSO 44. More particularly, laser receiver 34 receives a return laser signal, while optical receiver 39 (if present) receives an optical image of RSO 44 illuminated by laser beam 44. More particularly, the return laser signal received in laser receiver 34 allows for the detection of longitudinal motion of RSO 44, while the return optical image received by optical receiver 39 (if present) allows for the detection of transverse motion of RSO 44.

In block 504, SDA processor 38 receives return signal data, including a received laser power $P_r$, a change in wavelength of the laser beam $\Delta\lambda$, and a round-trip time-of-flight t.

In blocks 506, SDA processor 38 uses the return signal data to compute the range R to RSO 44 and the velocity v of RSO 44. According to certain embodiments of the disclosure, SDA processor 38 can also compute the rotational velocity $\omega_r$ and/or the aspect ratio of RSO 44.

In block 508, SDA processor 38 can adjust the operating parameters of laser beam 40 for subsequent illuminations. For instance, the transmit power $P_t$ and/or the pulse rate f may be adjusted to improve the quality of the returned signal(s) in a closed feedback loop as shown.

Those of ordinary skill in the art will appreciate that field of view 42 of sensor payload 30 (e.g., the size of space 42 illuminated by laser emitter 32 and within which RSO 44 can be detected, tracked, and characterized) is a function of various parameters. Moreover, those of ordinary skill in the art will appreciate that, by adjusting these parameters, detection range R can be traded for cone angle $\Theta$ and vice versa. That is, for a given transmit power $P_t$ and laser cross-section $\sigma$ of RSO 44, a narrower cone angle $\Theta$ will enable detection of RSOs 44 at greater range R; if a wider cone angle $\Theta$ is desired at the same transmit power $P_t$, like-sized RSOs 44 will only be detectable at closer range R.

In any event, it is desirable to configure field of view 42 of sensor payload 30 (e.g., cone angle $\Theta$, range R, and transmit power $P_t$) and set the pulse rate f of laser emitter 32 such that RSO 44 will be within field of view 42 for at least two successive pulses of laser emitter 32, thus ensuring that both laser receiver 34 and optical receiver 36 receive multiple exposures of RSO 44. This facilitates not only detection, but also tracking and characterization, of RSO 44.

Those of ordinary skill in the art will be familiar with the calculations relevant to defining field of view 42, which need not be discussed in further detail herein. By way of illustration, however, a transmit power $P_t$ of about 1.7 mJ and pulse rate f of about 16 kHz will allow for detection of RSOs having a laser cross-section σ as small as about 1 mm and a velocity v of up to about 16 km/s within a field of view 42 defined by a cone angle Θ of about 1.5° and a range R of up to about 1 km.

Once SDA processor 38 has detected RSO 44, it can compute a projected orbital trajectory of RSO 44. Various techniques for modeling orbital trajectories of RSOs will be known to those of ordinary skill in the art. Suitable commercially-available software for modeling orbital trajectories of RSOs is available from Ansys Government Initiatives and COMSPOC Corp., both of Exton, PA.

SDA processor 38 can also be used to characterize RSO 44. Characterization measurements include, without limitation, the size, aspect ratio, and the like of RSO 44. Characterization can also refer to SDA processor making a determination whether RSO 44 is more likely an active spacecraft or more likely a passive RSO (e.g., debris).

For instance, if the behavior of RSO 44 deviates from its predicted or projected behavior (e.g., its actual orbital trajectory, velocity, or the like deviates from its projected orbital trajectory, velocity, or the like) by more than a preset threshold amount, SDA processor can characterize RSO 44 as an active spacecraft as opposed to characterizing it as a passive RSO (e.g., debris).

Those of ordinary skill in the art will recognize that the projected orbital trajectory of RSO 44 can also be used (e.g., by SDA processor 38) to compute conjunctions between RSO 44 and spacecraft (or even other RSOs) of interest. Depending on the size of RSO 44, a spacecraft of interest can be maneuvered out of the way to avoid the conjunction and/or the RSO can be captured and removed from orbit. The former approach is often employed for relatively larger RSOs, while the latter can be applied to good advantage for relatively smaller RSOs (though it is also contemplated that a small number of relatively larger RSOs that become problematic or challenging to maneuver away from may also be captured or otherwise removed from orbit).

U.S. Pat. Nos. 9,617,017 and 9,714,101 and United States patent application publication nos. 2018/0111702 and 2018/0346153, all of which are hereby incorporated by reference as though fully set forth herein, describe various methods, systems, and apparatus for sensing and/or removing orbital debris and/or other RSOs. The instant teachings can be applied to good advantage in connection with the teachings of these foregoing patents and patent applications.

In this regard, and referring again to FIG. 1, SDA system 10 can further include a plurality of debris capture spacecraft 48 in Earth orbit. FIG. 1 depicts three debris capture spacecraft 48, but it should be understood that this is merely for purposes of illustration; any number of debris capture spacecraft 48 may be deployed without departing from the scope of the present disclosure.

Each debris capture spacecraft 48 includes at least one debris impact pad. As discussed above, U.S. Pat. Nos. 9,617,017 and 9,714,101, as well as United States patent application publication nos. 2018/0111702 and 2018/0346153, disclose various debris impact pad embodiments.

Another suitable embodiment of a debris impact pad 60 will be discussed with reference to FIG. 6. Debris impact pad 60 includes a plurality of spaced-apart shield layers 62.

Figure 6:
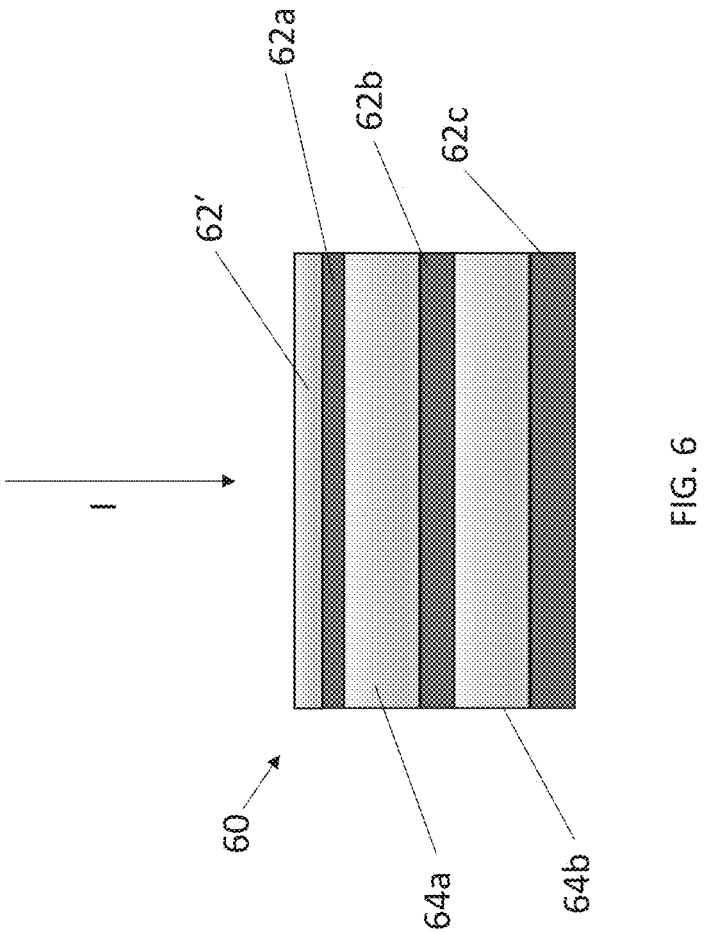
FIG. 6 is a planar view of a debris impact pad according to aspects of the instant disclosure.

Although FIG. 6 illustrates a total of three shield layers 62*a*, 62*b*, 62*c*, this is merely exemplary, and more or fewer shield layers are regarded as within the scope of the instant disclosure. Those of ordinary skill in the art will generally recognize this arrangement of shield layers 62 as structurally similar to that of a Whipple shield, though there are various differences between extant Whipple shields and debris impact pad 60 that will become apparent from the following description. In particular, debris impact pad 60 includes aspects to mitigate the creation of spall ejecta (about 1 mm and larger) that, to the inventors' knowledge, cannot be found in extant Whipple shields (that is, extant Whipple shields are susceptible to the creation of such spall ejecta, which itself can become potential LNT orbital debris, when struck by RSO 44).

Shield layers 62 are arranged in a series of planes that are non-parallel to an intercept direction I. The intercept direction I is the direction in which an RSO impacts debris impact pad 60. As shown in FIG. 6, intercept direction I is substantially perpendicular to shield layers 62, but this should not be regarded as limiting. To the contrary, the principles discussed herein will be relevant provided the velocity v of RSO 44 has a component along intercept direction I (e.g., RSO 44 obliquely strikes debris impact pad 60).

The densities and, optionally, the thicknesses of shield layers 62 increase along intercept direction I. That is, shield layer 62*a* is the thinnest and lowest-density shield layer, and shield layer 62*c* is the thickest and highest-density shield layer. In some embodiments of the disclosure, shield layer 62*a* is between about 1 mm and about 3 mm thick, while shield layers 62*b* and 62*c* are between about 6 mm and about 10 mm thick.

As such, shield layer 62*a* is the easiest for RSO 44 to penetrate, with RSO 44 desirably creating a clean entry hole (and minimal spall ejecta) when it strikes shield layer 62*a*. Because of the increasing thickness and/or density of successive shield layers 62*b*, 62*c*, further penetration will require progressively more energy, yet RSO 44 will have progressively less energy as it moves along intercept direction I.

A plurality of stuffing layers 64 (e.g., 64*a*, 64*b*) are interposed between shield layers 62. Like shield layers 62, the densities of stuffing layers 64 increase along intercept direction I (e.g., stuffing layer 64*b* has a higher density than stuffing layer 64*a*). Suitable materials for stuffing layers 64 include, without limitation, Nextel™ ceramic fibers and textiles (3M Advanced Materials Division, St. Paul, MN); aluminum; Kevlar® para-aramid synthetic fibers (DuPont, Wilmington, DE); and multilayer insulation (MLI) blankets (such as those available from Dunmore Aerospace, Bristol, PA). Aerogels may also be used in stuffing layers 64.

It is also contemplated that one or more of stuffing layers 64 may have a gradient density that increases along intercept direction I. That is, rather than the whole of stuffing layer 64*a* (for example) having a constant density, the density of stuffing layer 64*a* can increase along intercept direction I. This can be accomplished, for example, by using a gradient density material, such as a gradient density aerogel, in one or more stuffing layers 64. Alternatively or additionally, any given stuffing layer 64 can be made up of a plurality of sub-layers of differing materials, where the densities of the sub-layers increase along intercept direction I.

Shield layers 62 may be made of any suitable material, including both metallic and non-metallic materials, and may be of the same or differing materials. In general, however, suitable materials will be familiar to those of ordinary skill in the art. In some embodiments of the disclosure, it is contemplated that an initial shield layer 62' (e.g., upstream of shield layer 62a relative to intercept direction I) may be an aerogel (e.g., gradient density aerogel) material.

As shown in FIG. 6, shield layers 62a, 62b, 62c are spaced apart from each other. The spacing between shield layers 62 may be constant (e.g., about 10 cm) or may vary along the intercept direction I. This allows the energy of an impact to be effectively distributed across one or more shield layers 62.

By varying the thicknesses, densities, and spacing (collectively, the geometry of debris impact pad 60) as described above, debris impact pad 60 can be configured to minimize spall ejecta (that is, to minimize the creation of additional, potentially LNT, debris) when struck by RSO 44. As those of ordinary skill in the art will appreciate, the specific dimensions and characteristics of debris impact 60 can be adjusted depending on the nature, size, speed, and other aspects of RSOs 44 to be captured.

Debris impact pad 60 may advantageously include additional sensors that can be used to further characterize RSOs. For example, debris impact pad 60 may include pressure transducers or other sensors to measure a pressure wave that results from RSO 44 striking debris impact pad 60. These measurements may allow for the determination of the momentum and/or density of RSO 44.

As another example, debris impact pad 60 may include a two- or three-dimensional array of resistive sensors to detect impact location, the size of RSO 44, and/or the depth to which RSO 44 penetrates into debris impact pad 60. It is also contemplated that debris impact pad 60 can include a sensor payload similar to or the same as sensor payload 30.

Additional measurements using sensors on debris impact pad 60 can include the time of impact of RSO 44, the location on orbit of the impact (that is, the position of debris impact pad 60 in space when it is impacted), and the angle of incidence of the impact (which can help determine the inclination of the orbit of RSO 44).

Although the information measured by these additional sensors on debris impact pad 60 relates to captured space objects, not to RSOs still in orbit, it may be used to good advantage to characterize the orbital debris environment in a particular region of space generally (to determine, for example, the average size, velocity, density, and the like of RSOs in the area).

Although several embodiments have been described above with a certain degree of particularity, those skilled in the art could make numerous alterations to the disclosed embodiments without departing from the spirit or scope of this invention.

For example, SDA processor 38 can receive additional sensor inputs, such as inputs from electromagnetic sensors (e.g., Langmuir probes, radio antennas, radiometers, and the like) and/or other plasma sensors, to refine the detection, tracking, and characterization of RSOs 44.

As another example, although SDA processor 38 is shown as part of sensor payload 30 (so-called edge processing), it is also contemplated that some or all of the outputs from the active and passive sensors on board sensor spacecraft 18, as well as outputs from sensors on debris impact pad 60, can be processed elsewhere, such as within a terrestrial control center or on another spacecraft. Of course, processing could also be distributed (e.g., across several SDA processors 38 on board several sensor spacecraft 18 and/or within a terrestrial control center).

As yet another example, data from sensor payload 30 can be combined with other sensor data, such as from ground-based optical telescopes, radar, and the like, to enhance catalogs of RSOs through the incorporation of information regarding smaller RSOs that, heretofore, were not readily detectable, trackable, and/or characterizable.

As a still further example, in addition to being used for RSO capture, debris impact pad 60 according to the instant disclosure can also be used to shield spacecraft and/or fixed facilities (e.g., the International Space Station (ISS), on the Moon, or another planet) from impacts and/or as ballistic shielding more generally (e.g., as vehicle armor and/or as personal protective equipment). The teachings herein regarding debris impact pad 60 could also be employed to good advantage in connection with turbines (e.g., in aircraft engines), for example, to mitigate hazards associated with broken turbine blades, as well as in batteries.

By way of yet further example, debris impact pad 60 can be made symmetrical about shield layer 62c. So constructed, debris impact pad 60 will also exhibit the advantages described herein in the direction opposite intercept direction I shown in FIG. 6. Stated differently, such a symmetrical debris impact pad 60 can effectively capture RSOs approaching from either side, as opposed to only from one side.

As an additional example, shield layers 62 and/or stuffing layers 64 can vary not only in thickness and/or density, but also with respect to additional material properties such as porosity, elastic modulus, specific energy absorption capacity, longitudinal wave speed, Cunniff velocity, and the like.

All directional references (e.g., upper, lower, upward, downward, left, right, leftward, rightward, top, bottom, above, below, vertical, horizontal, clockwise, and counter-clockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A space domain awareness (SDA) system, comprising:
a plurality of sensor spacecraft, each sensor spacecraft of
the plurality of sensor spacecraft comprising:
an active optical sensor; and
an SDA processor configured to:
receive an output from the active optical sensor;
detect a resident space object (RSO) using the output
from the active optical sensor;
compute a projected orbital trajectory of the RSO
using the output from the active optical sensor;
and
characterize the RSO using the output from the
active optical sensor.

2. The SDA system according to claim 1, wherein the plurality of sensor spacecraft comprises a plurality of sensor spacecraft in equatorial low Earth orbit.

3. The SDA system according to claim 2, wherein the plurality of sensor spacecraft further comprises a first sensor spacecraft positioned at Lagrange point L4 and a second sensor spacecraft positioned at Lagrange point L5.

4. The SDA system according to claim 1, wherein the SDA processor is configured to characterize the RSO as an active spacecraft when an actual orbital trajectory of the RSO deviates from the projected orbital trajectory of the RSO by more than a preset threshold amount.

5. The SDA system according to claim 1, further comprising at least one additional sensor selected from the group consisting of passive optical sensors, electromagnetic sensors, and plasma sensors, and wherein the SDA processor is further configured to:

receive an output from the at least one additional sensor;

detect the RSO using the output from the active optical sensor and the output from the at least one additional sensor;

compute the projected orbital trajectory of the RSO using the output from the active optical sensor and the output from the at least one additional sensor; and characterize the RSO using the output from the active optical sensor and the output from the at least one additional sensor.

6. The SDA system according to claim 1, wherein the active optical sensor comprises:

a laser emitter configured to emit a non-collimated laser beam to illuminate a volume of space containing the RSO; and a laser detector configured to detect a reflection of the non-collimated laser beam from the RSO.

7. The SDA system according to claim 1, further comprising a plurality of debris capture spacecraft, wherein each debris capture spacecraft of the plurality of debris capture spacecraft includes at least one debris impact pad comprising:

a plurality of shield layers arranged in a series of planes, wherein the series of planes is non-parallel to an intercept direction, wherein each shield layer of the plurality of shield layers has a respective density, and wherein the respective densities of the plurality of shield layers increase along the intercept direction; and a plurality of stuffing layers interposed between the plurality of shield layers, wherein each stuffing layer of the plurality of stuffing layers has a respective density, and wherein the respective densities of the plurality of stuffing layers increase along the intercept direction.

8. The SDA system according to claim 7, wherein the plurality of stuffing layers comprises at least one aerogel layer, the at least one aerogel layer having a gradient density that increases in the intercept direction.

9. A space domain awareness (SDA) sensor, comprising:

a laser emitter configured to emit a non-collimated laser beam to illuminate a volume of space containing a resident space object (RSO);

a laser detector configured to detect a reflection of the non-collimated laser beam from the RSO; and an SDA processor in operable communication with the laser emitter and the laser detector and configured to compute a distance from the SDA sensor to the RSO.

10. The SDA sensor according to claim 9, wherein:

the laser emitter has a pulse frequency and is configured to emit a series of non-collimated laser beam pulses at the pulse frequency;

the non-collimated laser beam has a cone angle; and the pulse frequency and the cone angle are selected such that the RSO will be within the volume of space for at least two successive beam pulses of the series of non-collimated laser beam pulses.

11. The SDA sensor according to claim 10, wherein the SDA processor is further configured to compute a velocity of the RSO.

12. The SDA sensor according to claim 10, further comprising an optical detector configured to capture an optical image of the RSO when the volume of space is illuminated by the non-collimated laser beam.

13. An apparatus for capturing a resident space object (RSO), the apparatus comprising:

a plurality of shield layers arranged in a series of planes, wherein the series of planes is non-parallel to an intercept direction, wherein each shield layer of the plurality of shield layers has a respective density, and wherein the respective densities of the plurality of shield layers increase along the intercept direction.

14. The apparatus according to claim 13, wherein each shield layer of the plurality of shield layers has a respective thickness, and the respective thicknesses of the plurality of shield layers increases along the intercept direction.

15. The apparatus according to claim 13, further comprising a plurality of stuffing layers interposed between the plurality of shield layers.

16. The apparatus according to claim 15, wherein each stuffing layer of the plurality of stuffing layers has a respective density, and wherein the respective densities of the plurality of stuffing layers increase along the intercept direction.

17. The apparatus according to claim 15, wherein at least one stuffing layer of the plurality of stuffing layers has a gradient density that increases along the intercept direction.

18. The apparatus according to claim 15, wherein the plurality of stuffing layers comprises an aerogel layer.

19. The apparatus according to claim 13, wherein the plurality of shield layers are spaced apart from each other along the intercept direction, and wherein a spacing between successive shield layers of the plurality of shield layers is configured to minimize spall ejecta from the apparatus when the RSO, traveling along the intercept direction, impacts the plurality of shield layers.

20. An apparatus for capturing a resident space object (RSO), the apparatus comprising:

a first shield layer;

a second shield layer spaced apart from the first shield layer along an intercept direction;

a first stuffing layer between the first shield layer and the second shield layer;

a third shield layer spaced apart from the second shield layer along the intercept direction; and a second stuffing layer between the second shield layer and the third shield layer;

wherein at least one of the first stuffing layer and the second stuffing layer comprises a gradient density aerogel oriented to have a density that increases along the intercept direction.

* * * * *